(12) United States Patent
Wernersson et al.

(10) Patent No.: US 8,885,749 B2
(45) Date of Patent: Nov. 11, 2014

(54) RADIO BASE STATION AND METHOD THEREIN FOR TRANSFORMING A DATA TRANSMISSION SIGNAL

(75) Inventors: Niklas Wernersson, Solna (SE); Svante Bergman, Hägersten (SE); George Jöngren, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/520,906

(22) PCT Filed: Mar. 2, 2012

(86) PCT No.: PCT/SE2012/050240
§ 371 (c)(1),
(2), (4) Date: Jul. 6, 2012

(87) PCT Pub. No.: WO2013/129985
PCT Pub. Date: Sep. 6, 2013

(65) Prior Publication Data
US 2013/0230081 A1    Sep. 5, 2013

(51) Int. Cl.
*H04B 7/02*    (2006.01)
(52) U.S. Cl.
USPC ........... 375/267; 370/328; 370/329; 375/220; 706/24
(58) Field of Classification Search
None
See application file for complete search history.

(56) References Cited

U.S. PATENT DOCUMENTS

2010/0067605 A1* 3/2010 Jongren ................. 375/267
2011/0249637 A1  10/2011 Hammarwall et al.
2013/0162476 A1* 6/2013 Thomas et al. ........ 342/372

FOREIGN PATENT DOCUMENTS

EP      2161783 A1    3/2010
WO   2004023665 A2    3/2004
WO   2007076895 A1    7/2007

* cited by examiner

*Primary Examiner* — Adolf Dsouza
(74) *Attorney, Agent, or Firm* — Murphy, Bilak & Homiller, PLLC

(57) ABSTRACT

A method in a radio base station for transforming a data transmission signal in a radio communications network. The radio base station is connected to an active antenna array of a first number of active transmitting antennas, which each active transmitting antenna comprises sub elements. The radio base station comprises a precoder codebook comprising precoders for transmitting signals in a diversified manner for a second number of antenna ports. The radio base station precodes the data transmission signal with a precoder selected from the precoder codebook. The radio base station furthermore transforms, linearly, the precoded data transmission signal by neutralizing a direction of the precoded data transmission signal and then directing the precoded data transmission signal vertically. The precoded data transmission signal is thereby enabled to be vertically adjusted towards a user equipment in the radio communications network.

32 Claims, 10 Drawing Sheets

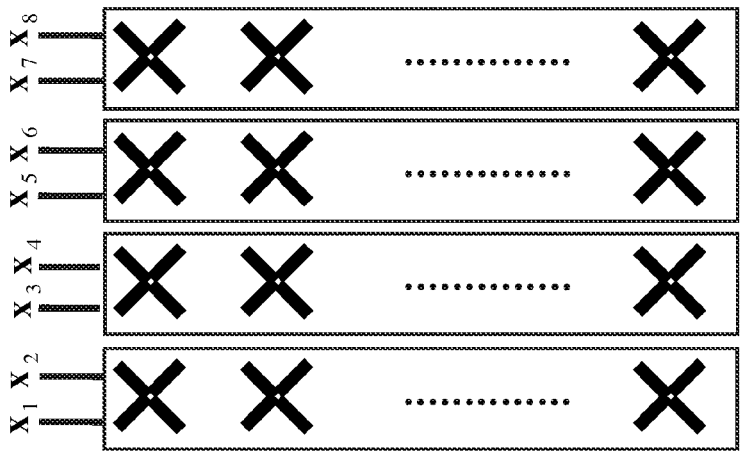
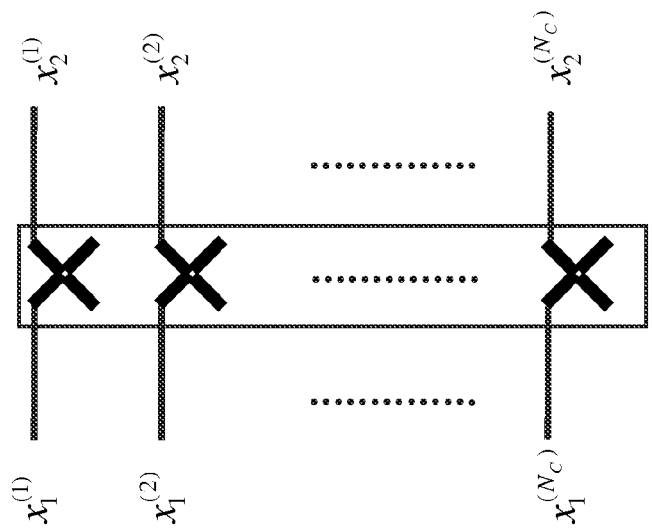
PRIOR ART
Figure 5

RADIO BASE STATION AND METHOD THEREIN FOR TRANSFORMING A DATA TRANSMISSION SIGNAL

TECHNICAL FIELD

Embodiments herein relate to a radio base station and a method therein. In particular, embodiments herein relate to transform a data transmission signal in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications (GSM)/Enhanced Data rate for GSM Evolution (EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments are served in the cells by the respective radio base station and are communicating with respective radio base station. The user equipments transmit data over an air interface to the radio base stations in uplink (UL) transmissions and the radio base stations transmit data to the user equipments in downlink (DL) transmissions.

Multi-antenna techniques may significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. For instance there is in LTE-Advanced support for a spatial multiplexing mode with possibly channel dependent precoding. The spatial multiplexing mode is aimed for high data rates in favorable channel conditions. An illustration of the spatial multiplexing operation is provided in FIG. 1. An information carrying symbol vector s is multiplied by an '$N_T \times r$' precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols may be transmitted simultaneously over the same time/frequency resource element (TFRE). The number of symbols r is typically adapted to suit the current channel properties. The precoded signals are then Inverse Fast Fourier Transformed (IFFT).

LTE uses Orthogonal frequency Division Multiplexing (OFDM) in the downlink, and Discrete Fourier Transform (DFT) precoded OFDM in the uplink, and hence the received $N_R \times 1$ vector $y_n$, where $N_R$ is number of receiver ports, for a certain TFRE on subcarrier n, or alternatively data TFRE number n, is thus modeled by $$y_n = H_n W_{N_T \times r} s_n + e_n$$

where $e_n$ is a noise/interference vector obtained as realizations of a random process. The precoder matrix, $W_{N_T \times r}$, may be a wideband precoder, which is constant over frequency, or frequency selective. Note that the signals above, e.g. $y_n$, may alternatively represent a signal in a time-domain. It is generally understood that signals mentioned may represent signals in other domains than in the time-frequency grid of an OFDM system.

The precoder matrix is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding for the LTE downlink, the UE transmits, based on channel measurements in the forward link (downlink), recommendations to the radio base station of a suitable precoder to use. The UE selects a precoder out of a countable and finite set of precoder alternatives, referred to as a precoder codebook. A single precoder that is supposed to cover a large bandwidth, wideband precoding, may be fed back. It may also be beneficial to match the frequency variations of the channel and instead feed back a frequency-selective precoding report, e.g. several precoders, one per subband of the large bandwidth. This is an example of the more general case of Channel State Information (CSI) feedback, which also encompasses feeding back other entities than precoders to assist the radio base station in subsequent transmissions to the UE. Such other information may include Channel Quality Indicators (CQIs) as well as transmission Rank Indicator (RI).

For the LTE uplink, the use of closed-loop precoding means the radio base station is selecting precoder(s) and transmission rank and thereafter signals the selected precoder that the UE is supposed to use.

Already Release-8, the first release, of LTE supports codebook based precoding for 2 antennas, a so called 2 Tx Codebook. Up to two layers may be transmitted, rank 1 and rank 2, thus making the precoder matrix $W_{2 \times r}$ of dimension 2×1 and 2×2, respectively. The precoder 2 Tx Codebook comprises a total of six precoders $$W_{2 \times r} \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 1 & 1 \\ 1 & -1 \end{bmatrix}, \begin{bmatrix} 1 & 1 \\ j & -j \end{bmatrix} \right\}$$

out of which the first four precoders are seen to represent rank one and the rest rank 2.

LTE Release-10 and later supports a transmission mode for up to 8-layer spatial multiplexing for 8 Tx antenna ports using UE specific Reference Signal (RS), also referred to as a 8 Tx precoder codebook. An antenna port may not necessary correspond to a physical antenna but may also correspond to multiple antennas. Rank adaptation and possibly channel dependent precoding is also supported. UE specific RS is used for demodulation purposes and because of that the radio base station is free to use whatever precoder(s) it wants to, but it may be assisted in the determination of precoder(s) via CSI feedback from the UE that includes recommended precoder(s). For the time-frequency resource of interest, the UE selects a precoder out of a set of possible precoders in a precoder codebook. The available precoders in the precoder codebook are of a special factorized structure; a precoder may be written as a product of two matrix factors $$W_{8\times r} = W_{8\times 2k}^{(c)} W_{2k\times r}^{(t)} = \begin{bmatrix} \tilde{W}_{4\times k}^{(c)} & 0 \\ 0 & \tilde{W}_{4\times k}^{(c)} \end{bmatrix} W_{2k\times r}^{(t)}$$

where an 8×2 k conversion precoder $W_{8\times 2k}^{(c)}$ strives for capturing wideband/long-term properties of the channel such as correlation while a 2 k×r tuning precoder $W_{2k\times r}^{(t)}$ targets frequency-selective/short-term properties of the channel. Together they form the overall precoder $W_{8\times r}$ which together with an input symbol vector $S_{r\times 1}$ produces an output signal $x_{8\times 1} = W_{8\times r} S_{r\times 1}$ for r layers. The parameter k is in LTE taken to be equal to four for rank 1 and 2. Further details concerning the LTE codebook are found in 3GPP TS 36.213 V10.4.0, "Evolved Universal Terrestrial Radio Access (E-UTRA); Physical layer procedures" section 7.2 and 3GPP TS 36.211 v10.3.0 section 6.3.4.2.3.

In order for the UE to generate feedback regarding the current channel conditions a set of pre-defined channel state information reference signals (CSI-RS) may be transmitted from the radio base station to the user equipment. Based on the CSI-RS, the UE can estimate the channel and consequently also figure out which precoder suits the particular channel. For the purpose of CSI feedback determination, the UE assumes that each of the rows in $x_{8\times 1}$ corresponds to an antenna port, ports 15-22, on which a CSI-RS is transmitted. The first row represents antenna port 15, second row antenna port 16 and so on. Each CSI-RS is typically transmitted from an antenna of its own, meaning that there is a direct correspondence between an antenna port and a physical antenna.

The design target of the 8 antenna-port LTE codebook was an 8 Tx antenna array with either four closely spaced cross-poles or eight closely spaced co-poles placed in a uniform and linear fashion. For the former case the first four rows of $W_{8\times 2k}^{(c)}$ will target a first polarization (they are all co-polarized) and the remaining four antennas target a polarization orthogonal to the former polarization. Due to the structure of $W_{8\times 2k}^{(c)}$, beamforming is conducted separately for each polarization followed by precoding between polarizations. For the case of eight co-poles, all the eight rows of matrix $W_{8\times 2k}^{(c)}$ will be used to perform beamforming in one polarization. Beamforming is achieved by controlling phase and relative amplitude of the signal at each active transmitting antennas by combining elements in an antenna array in a way where signals at particular angles experience constructive interference and while others experience destructive interference.

Antenna Arrays

On the network side, radio base stations are often equipped with multiple antennas to be used for reception and transmission. The antennas intended for a cell, and/or a sector, form a so-called antenna array. Some typical antenna array constellations are illustrated in FIGS. 2(a)-(b). For instance, one common antenna array layout is to use co-polarized antennas in order to construct antenna arrays as shown in FIG. 2(a). Furthermore, another common layout is to instead use cross-polarized antennas as shown in FIG. 2(b). FIG. 2(a) shows 1 Tx, 2 Tx and 4 Tx co-polarized antenna arrays and FIG. 2(b) shows 2 Tx, 4 Tx and 8 Tx cross-polarized antenna arrays. Using for instance a 2 Tx cross-polarized antenna array, e.g. the top most antenna setup in FIG. 2(b), implies that the antenna array is fed with two signals, $x_1$ and $x_2$.

This is illustrated in FIG. 3 where it has been assumed that a 2 Tx antenna array is used with codebook based precoding and thus $x_{2\times 1} = W_{2\times r} S_{r\times 1}$. An example of a codebook $W_{2\times r}$ was presented above. Thus, FIG. 3 shows illustrations of codebook based precoding based with a 2 Tx cross-polarized antenna array.

Active Antennas or Active Transmitting Antennas

An active antenna array comprises a number of sub elements or small physical devices that jointly form the active transmitting antenna. In FIG. 4(a) a sub element, in practice realized by a small physical device, is illustrated. Each sub element will have a polarization direction which potentially may be orthogonal to another sub element's polarization. This is illustrated in FIG. 4(b) where a sub element with orthogonal polarization compared to the sub element in FIG. 4(a) is shown. Finally, in FIG. 4(c) an active antenna array which comprises $N_c$ sub elements is shown. In general, but not necessarily, all the sub elements of an active transmitting antenna of an active antenna array are of the same polarization. Note that each given sub element j can be fed the given signal $x^{(j)}$ not necessarily equal to $x^{(i)}$, which is a signal for the active transmitting antenna i. Thus, FIG. 4(a) shows a sub element; FIG. 4(b) shows a sub element in the polarization orthogonal to the polarization of the sub element in FIG. 4(a); and FIG. 4(c) shows sub elements 1 ... $N_c$ of an active antenna array comprising an active transmitting antenna i=1.

In this document, when dealing with more than one active transmitting antenna, we will adopt the notation $x_i^{(j)}$ when referring to a signal, or function, related to the j:th sub element in the i:th active transmitting antenna. These indexes will however be omitted when it is clear from the context what is being referred.

By combining two active antennas of different polarizations, as illustrated in FIG. 5(a), a 2 Tx antenna array may be created and fed with two different signals, $x_1$ and $x_2$ where $x_i = [x_i^{(1)} \ldots x_i^{(N_c)}]^T$, where i is the active transmitting antenna, and $N_c$ is the sub elements of the active transmitting antenna. Furthermore, by combining multiple 2 Tx antenna arrays, as illustrated in FIG. 5(b), an 8 Tx antenna array can be created. Here the signals $x_{j2}^{(j1)}$ are no longer explicitly shown but they are still assumed to be present in the same manner as in FIG. 5(a). FIG. 5(a) thus depicts a 2 Tx active antenna array and FIG. 5(b) depicts an 8 Tx active antenna array.

Existing precoder codebooks in different standards have been designed for conventional antenna arrays. In for instance LTE Release 10 and beyond, precoder codebooks for 2, 4 or 8 Tx antennas are supported. There is thus a precoder codebook suitable for each antenna array type. Hence, when using for instance a 2 Tx antenna array the standard supports the use of the 2 Tx codebook meaning that $x_1$ and $x_2$ can be fed to the antenna array just as in FIG. 3.

An active antenna array comprises many sub elements and arrays of active antennas comprise even more. Such antenna setups were neither thought of, nor taken into account, when the existing codebooks were designed. Therefore, existing precoder codebooks do not utilize the fact that the sub elements can be accessed and fed with a signal as illustrated in FIGS. 5(a)-(b).

Today, there exists no manner to use precoder codebooks for transmitting data transmission signals in an active antenna array of a number of active transmitting antennas in an efficient and reliable manner.

SUMMARY

An object of embodiments herein is to enable an efficient use of an active antenna array in a radio communications network.

The object is achieved by embodiments herein wherein a method in a radio base station for transforming a data transmission signal in a radio communications network is disclosed. The radio base station is connected to an active antenna array of a first number of active transmitting antennas, and the active antenna array comprises sub elements. The radio base station serves a user equipment in the radio communications network. Furthermore, the radio base station comprises a precoder codebook comprising precoders for transmitting signals in a diversified manner for a second number of antenna ports. The radio base station precodes a data transmission signal with a precoder selected from the precoder codebook. The radio base station transforms, linearly, the precoded data transmission signal by neutralizing a direction of the precoded data transmission signal and then directing the precoded data transmission signal vertically. Thereby, the precoded data transmission signal is enabled to be vertically adjusted towards the user equipment.

By transforming the precoded data transmission signal accordingly the radio base station is enabled to use the active antenna array in an efficient and reliable manner to direct the data transmission signal.

The object is achieved according to embodiments herein by a radio base station for transforming a data transmission signal in the radio communications network. The radio base station is configured to connect to an active antenna array of a first number of active transmitting antennas, and which active antenna array comprises sub elements. Furthermore, the radio base station is configured to comprise a precoder codebook comprising precoders for transmitting signals in a diversified manner for a second number of antenna ports. The radio base station comprises a precoding circuit configured to precode the data transmission signal with a precoder selected from the precoder codebook. The radio base station further comprises a transforming circuit configured to transform, linearly, the precoded data transmission signal by neutralizing a direction of the precoded data transmission signal and then directing the precoded data transmission signal vertically. Thereby, the precoded data transmission signal is enabled to be vertically adjusted towards the user equipment.

Some embodiments herein further allow precoder feedback from the UE to be used for guiding UE specific beamforming in the elevation domain using the active antenna array even if only existing codebooks not designed for the purpose are available. Thus, embodiments herein disclose how to transform data transmission signals precoded using a precoder in a precoder codebook so that the data transmission signals suit an active antenna array for diversifying the data transmission signals at least in the elevation domain, and an efficient linear transformation adapted to the precoder codebook is used to direct or form the data signal transmission or beams more suitable for the active antenna array.

BRIEF DESCRIPTION OF THE DRAWINGS

Embodiments will now be described in more detail in relation to the enclosed drawings, in which:

FIG. 5a-b are illustrations of active antenna arrays of a number of active transmitting antennas.

DETAILED DESCRIPTION

Figure 1:
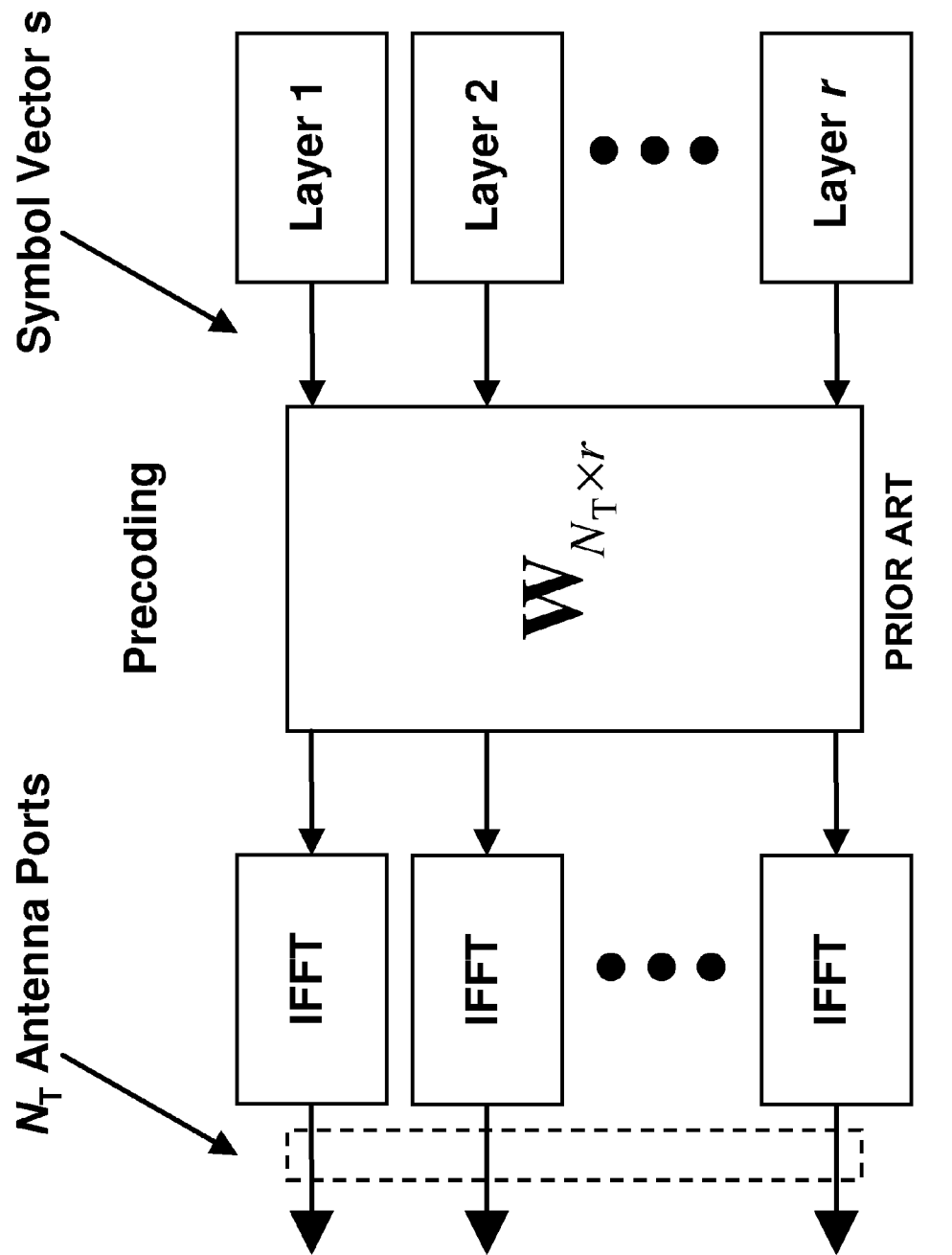
FIG. 1 is a transmission structure of precoded spatial multiplexing mode in LTE.
Figure 2:
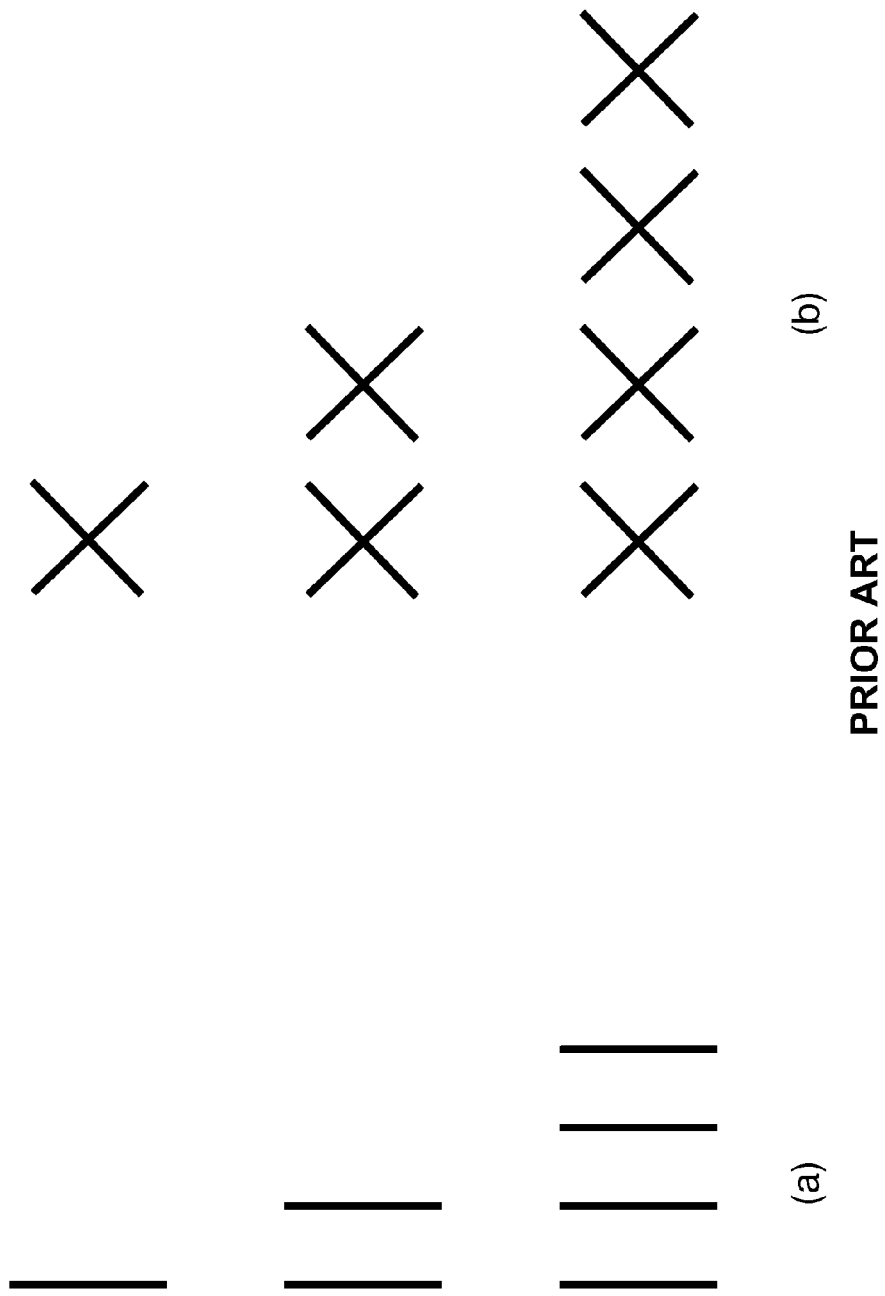
FIGS. 2a-b are illustrations of a number of TX antennas of different polarization.
Figure 3:
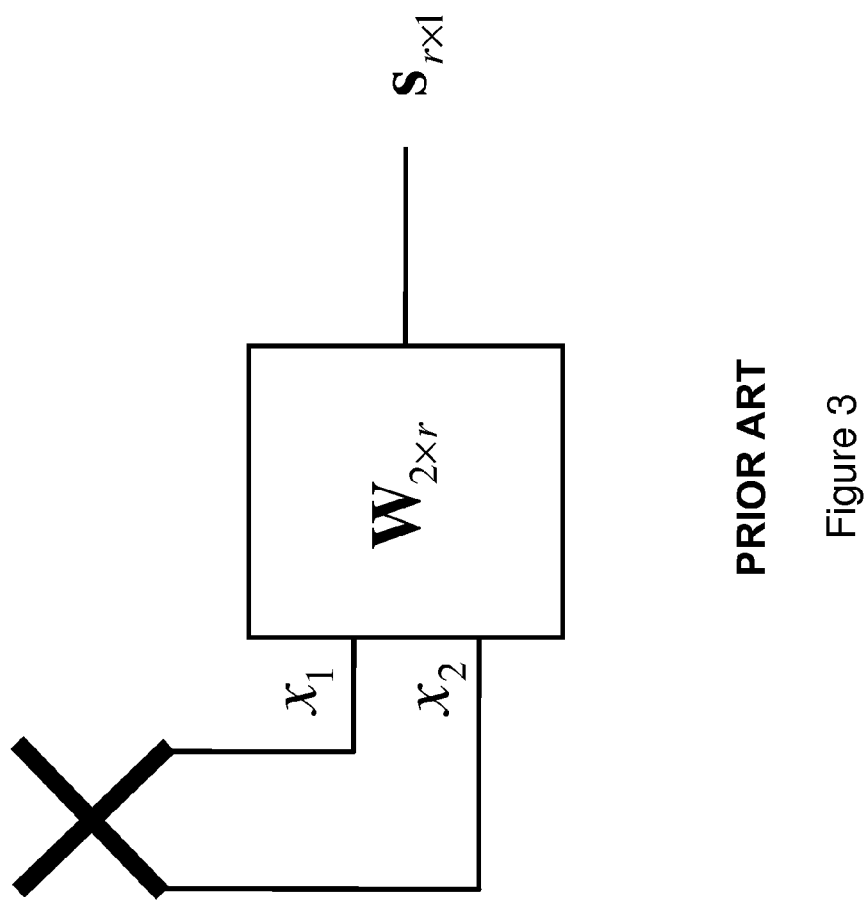
FIG. 3 is a block diagram depicting a radio base station.
Figure 4:
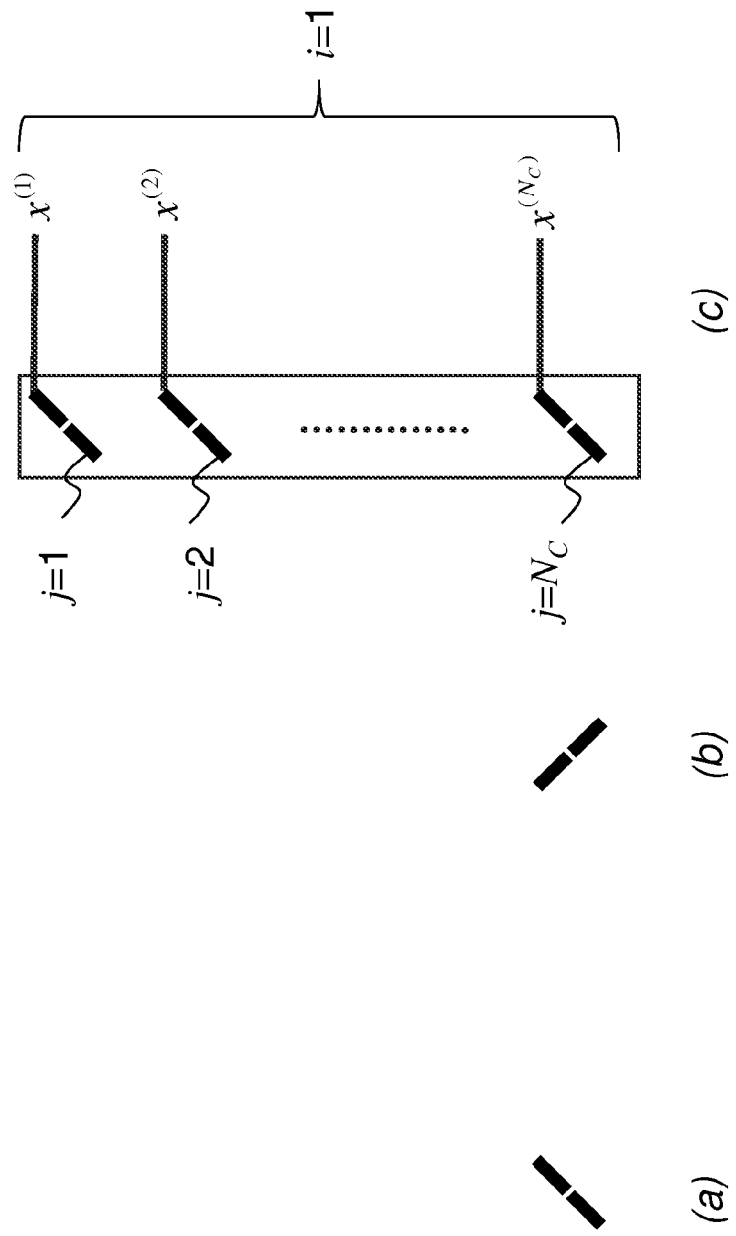
FIG. 4a-c are illustrations of sub elements of active transmitting antennas.
Figure 6:
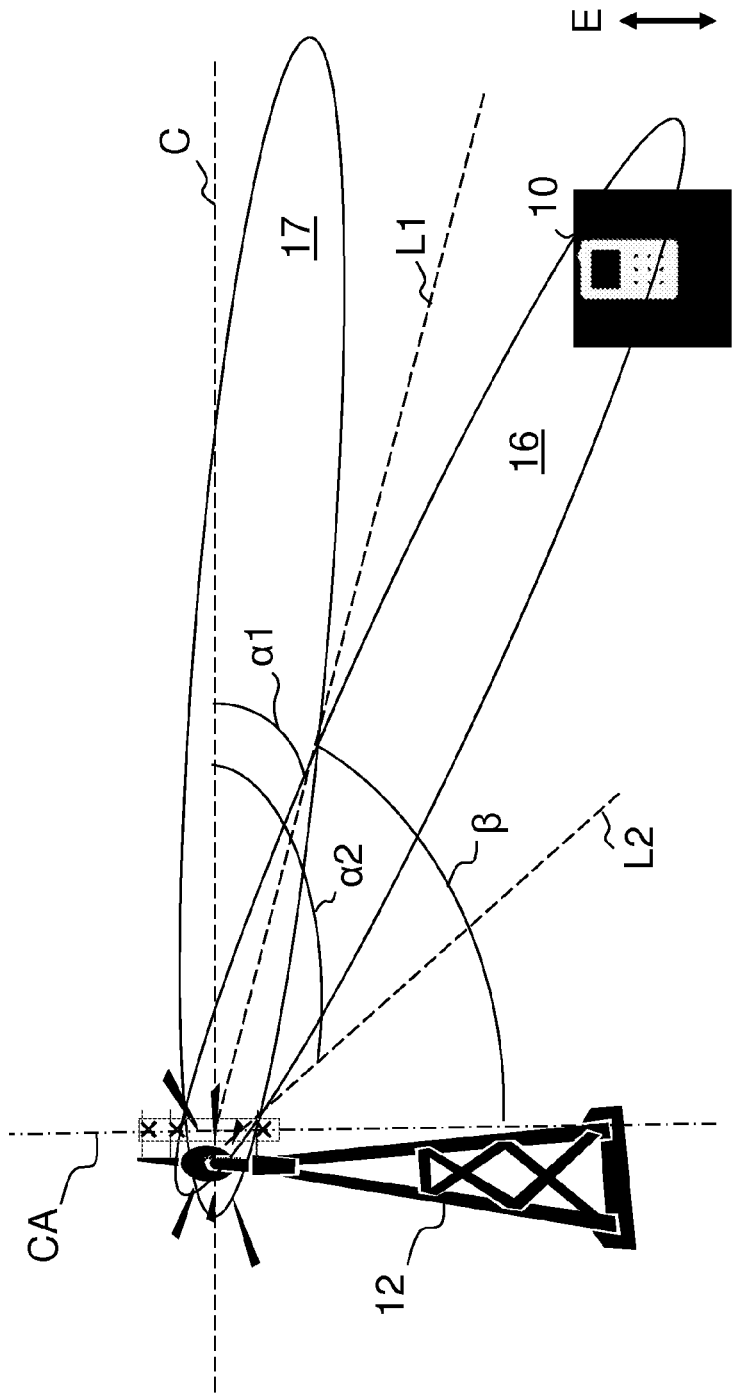
FIG. 6 is a schematic overview depicting a radio communications network according to embodiments herein.

FIG. 6 is a schematic overview depicting embodiments in a radio communications network. In today's radio communications networks a number of different technologies are used, such as LTE, LTE-Advanced, WCDMA, GSM/EDGE, WiMax, or UMB, just to mention a few possible implementations. The radio communications network comprises a radio base station 12 providing radio coverage over at least one geographical area forming a cell. The cell definition may also incorporate frequency bands used for transmissions, which means that two different cells may cover the same geographical area but using different frequency bands. A user equipment 10 is served in the cell by the radio base station 12 and is communicating with the radio base station 12. The user equipment 10 transmits data over an air or radio interface to the radio base station in uplink (UL) transmissions and the radio base station 12 transmits data over an air or radio interface to the user equipment 10 in downlink (DL) transmissions.

According to embodiments herein the radio base station 12 comprises an active antenna array of a number of transmitting (Tx) antennas, which active transmitting antenna comprises a number of sub elements. The sub elements may have different polarizations e.g. be cross polarized to one another and arranged along a vertical axis or vertically. Furthermore, the radio base station 12 comprises a precoder codebook comprising precoders for transmitting signals in a diversified manner for a second number of antenna ports.

The radio base station 12 precodes the data transmission signal with a precoder from the precoder codebook. A selection of the precoder used may be based on feedback from the user equipment 10 of reference signals from the radio base station 12. For example, the radio base station 12 may use a precoder codebook for eight antenna ports configured to be used to diversify transmit or input signals in an azimuth domain. The radio base station 12 precodes the data transmission signal using one of the precoders in the precoder codebook. E.g, the radio base station 12 may use a precoder from the precoder codebook for eight antenna ports for the data transmission signal to be diversified azimuthally relative other data transmission signals.

However, according to embodiments herein the radio base station 12 transforms the precoded data signal using a transformation, which transformation directs signals vertically. The transformation first neutralizes the direction of the data transmission signal and then directs the data transmission signal vertically. The transformation may be performed by multiplying a signal vector of the data transmission signal with a first matrix to match directions in the precoded data transmission signal. Matching directions herein means neutralizing the direction of the signal vector of the precoded data transmission signal. The transformation may further multiply with a second matrix to direct the data transmission signal vertically. Thus, an output vector is obtained from multiplying the signal vector with a first matrix and then a second matrix, wherein the first matrix matches the direction and the second matrix directs signal in elevation. The first matrix comprises at least one row vector of a number of row vectors that is equal to the complex conjugate transpose of a column vector in the precoder codebook. Thus, the transformation enables the precoded data transmission signal to be directed vertically also referred to as elevation beamforming.

Embodiments herein relate to transformation of precoded data transmission signal or signals for active antenna arrays. Embodiments herein relate to details on how to transform a data transmission signal precoded with a precoder codebook so that it suits an active antenna array for enabling the directing of the data transmission signal at least in the elevation domain. A linear transformation adapted to a particular precoder codebook is used to form data transmission signals or beams more suitable for the active antenna array of interest.

The radio base station 12 may then transmit the transformed data signal over at least one sub element to the user equipment 10. Thus, the radio base station 12 may direct or beamform data signals vertically or along an elevation axis, denoted 'E' in the FIG. 6, towards the user equipment 10 based on feedback from the user equipment 10. In some embodiments the transformed data signal is limited to be transmitted in a direction within a range of elevation angles in order to reduce interference towards neighboring cells. An elevation angle may be defined in relation to a centre plane or a centre axis C of a sub element transmitting the transformed data signal. The range may e.g. be between 10°-75° from the centre axis or a horizontal line of the active antenna array or of a sub element over which the data signal is transmitted. Thus, the interval of elevation angles may reach between a lower angle $\alpha 1$ and an upper angle $\alpha 2$. The lower angle $\alpha 1$ may be set to restrict an up-tilt of the transformed data signal along a first line L1 thereby reducing or omitting energy interfering transmissions at a neighbouring radio base station. The upper angle $\alpha 2$ may be set along a second line L2. The upper angle $\alpha 2$ may not be set at all and the interval may be defined solely on the lower angle $\alpha 1$. The radio base station 12 may transmit the data signal or actually a number of data signals forming a beam 16 towards the user equipment 10, avoiding transmitting an up-tilted beam 17, which would likely interfering transmissions in a neighbouring cell. It should however be noted that in some embodiments the up tilt is not limited and up-tilting is something that one wants to achieve. It should be understood that the elevation angle may alternatively be defined in relation to a centre axis CA of the active antenna array, denoted as $\beta$ in the FIG. 7. Then the threshold or the end/top angle in the range, e.g. to the first line L1, would be a high elevation angle value that would limit the data signal towards other cells. E.g., the range may stretch from 0-85°. Embodiments herein may inform the user equipment 10 to decide feedback and e.g. precoder to use on reference signals or reference beams for elevation beamforming with an up tilt restriction. This may be performed during configuration of the user equipment 10. Thereby embodiments avoid that this choice is made on an opportunistic basis only taking into account the impact on a single link from the radio base station 12 to the user equipment 10. Thus, embodiments herein avoid that beams are selected which seem to maximize the performance of the link but is harmful to the performance of the entire system. Beams may be selected with sufficient down-tilt so that not too much transmitted energy leaks into other cells and causes interference. The radio base station 12 may limit which precoders the user equipment 10 may select from the configured precoder codebook so as to avoid transmitting energy in directions with too little down-tilt. The radio base station 12 may for example use a mechanism of codebook subset restriction to forbid the user equipment 10 to report precoders in the codebook which lead to signals or beams directed too much upwards. A threshold level, or a top angle, in the angular domain, herein called elevation angle domain, could be used to exclude precoders whose main data signal or beam is considered to be pointing too much upwards. The phase and amplitude over the sub elements defines the elevation angle and thus the chosen precoder will also affect the resulting elevation angle. The elevation angles may for instance be determined by identifying a maxima of a main lobe of the beams. A good rule of thumb may be to set the threshold level or a lower/top angle of a range of elevation angles so that the beams or data signals do not point above an optimized beam direction of a fixed beam solution that would have been used when active antennas are not used. When Discrete Fourier Transform (DFT) based precoders are used an ordering of the precoders may be introduced, and precoders after or before a certain precoder may be excluded from an allowed subset of precoders that the user equipment 10 may report, so as to avoid excessive overhead by explicitly specifying the subset restriction for each precoder. The threshold level or the range of elevation angles may also be made dependent on the system load; a low system load would allow beams pointing more upwards, and the opposite is true for the case of higher system load. In general, use of directions with less down-tilt should be more limited the higher the system load is.

Vertically or vertical direction is defined as aligned with a gradient of the gravity field, i.e., with the direction of the gravitational force at a position of the user equipment 10. The vertical axis being an axis aligned with a normal to a surface plane of the radio base station 12 or the user equipment 10.

Although the description is mainly given for UE, it should be understood by the skilled in the art that "UE" is a non-limiting term which means any wireless device or node e.g. Personal Digital Assistant (PDA), laptop, mobile, sensor, relay, mobile tablets or even a small base station that are being positioned, i.e. a Location Server (LCS) target in general.

The radio base station 12 may also be referred to as e.g. a NodeB, an evolved Node B (eNB, eNode B), a base transceiver station, Access Point Base Station, base station router, or any other network unit capable to communicate with the user equipment 10 within the cell or cells served by the radio base station 12 depending e.g. of the radio access technology and terminology used. The radio base station 12 may also be referred to as a relay node or a beacon node.

It should here be noted that the data signal may be a part of a beam of data signals and the method applies also for a plurality of data signals.

Figure 7:
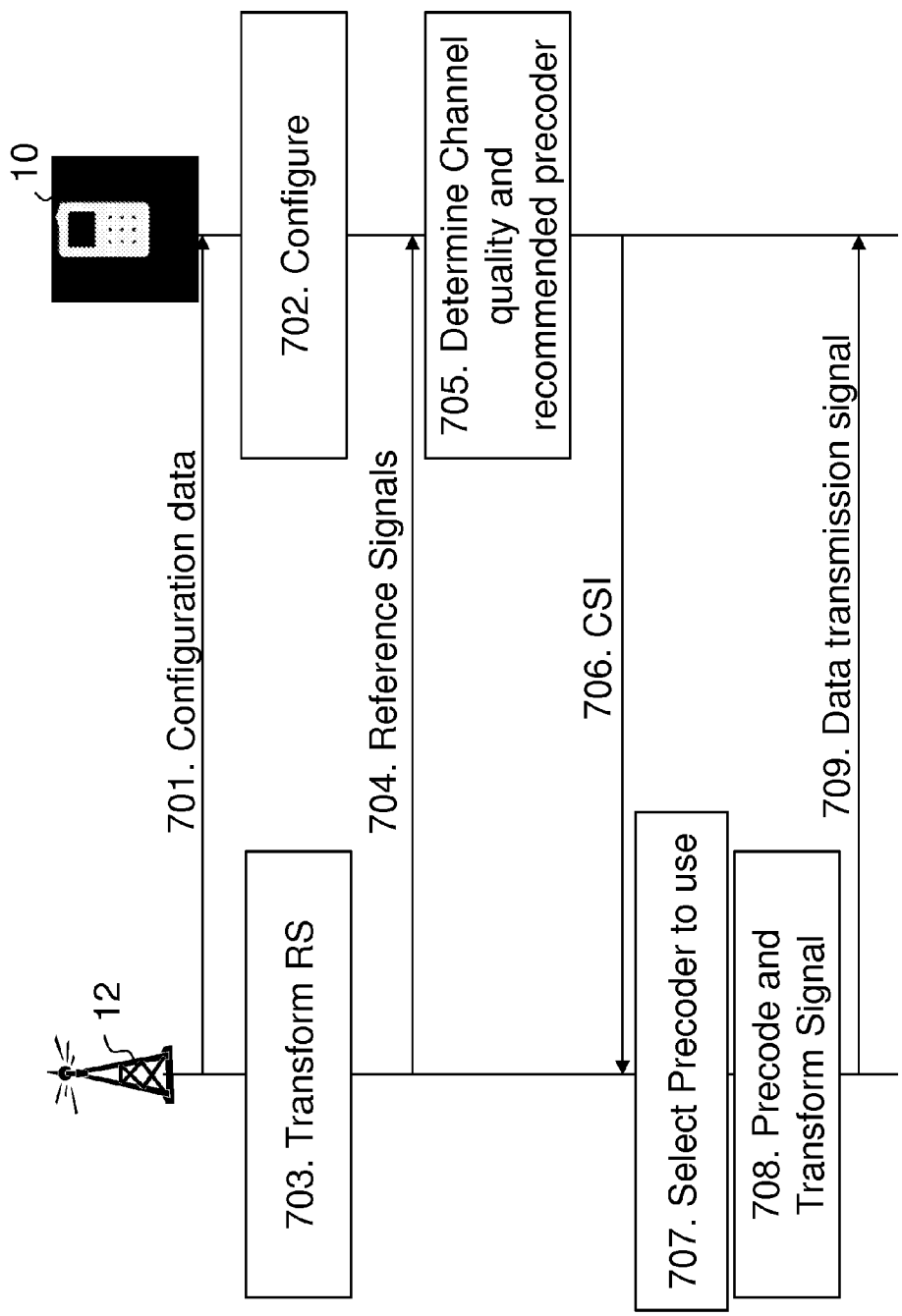
FIG. 7 is a combined flowchart and signaling scheme according to embodiments herein.

FIG. 7 is a combined flowchart and signaling scheme in the radio communications network according to some embodiments herein. The actions may be performed in any suitable order.

Action 701.

The radio base station 12 transmits configuration data to the user equipment 10 configuring which precoder codebook is used and may also configure which precoders to report feedback of.

Action 702.

The user equipment 10 configures itself according to the received configuration data.

Action 703.

The radio base station 12 transforms reference signals to be directed or diversified along the vertical axis or the elevation axis E. A set of reference symbols is defined in the radio base station 12. Each reference signal is then transformed to and fed to the sub-elements according to a pattern also referred to as a mapping pattern. The mapping pattern defines the mapping of output signals from the transformation to sub elements of each active transmitting antenna of the active antenna array.

Action 704.

The radio base station 12 transmits the transformed reference signals to the user equipment 10.

Action 705.

The user equipment 10 determines channel quality of the different reference signals and determines e.g. a recommended precoder from the precoder codebook. Based on the reference signals, the user equipment 10 may determine a recommended transmission hypothesis, e.g. a recommended rank, a recommended precoder to use, and a Channel Quality Indicator (CQI) channel quality indicator.

Action 706.

The user equipment transmits an indicator of the determined channel quality such as a CQI, and the recommended precoder to the radio base station 12 in CSI. E.g. the user equipment 10 transmits a recommended transmission hypothesis to the base station 12. The transmission hypothesis may comprise an indicator of a recommended precoder and a channel quality indicator.

Action 707.

The radio base station 12 receives the recommended transmission hypothesis comprising e.g. the channel quality, the CQI, and the recommended precoder from the user equipment 10. Based on the received recommended transmission hypothesis, and/or a locally stored parameter, such as received transmission hypotheses from other user equipments', the radio base station 12 may make a scheduling decision where the radio base station 12 selects which precoder to use. The radio base station 12 comprises a precoder codebook for a number, $N_T$, Tx antennas or for a number, $N_T$, of antenna ports.

The radio base station 12 may comprise an active antenna array of A number, $N_A$, active transmitting antennas where each active transmitting antenna comprises a C number, $N_C$, of sub elements. The radio base station 12 is in general not designed for precoding for the general case of $(N_A, N_C)$. According to some embodiments herein a way to support existing precoder codebooks for a T number, $N_T$, of transmitting, Tx, antenna ports, also referred to as $N_T$ Tx codebook, and to transform the data signals for a given $(N_A, N_C)$.

Action 708.

The radio base station 12 then precodes the data signal using the selected precoder and transforms the precoded data signal. The determined or selected precoder is actually directing the transmission of the data signal vertically as the transformation used for both the reference signals and the data signal directs the different signals vertically according to an elevation angle. Thus, the radio base station 12 directs or beamforms the data signal or signals forming a beam vertically toward the user equipment 10. As the same transformation is used for both the reference signal and the data signal, the effective channel including the transformation may be estimated by the UE and the proper precoder may be determined.

Embodiments herein disclose the transformation that enables beamforming in the elevation domain using active antenna array even if only existing codebooks not designed for the purpose are available.

For example; some embodiments herein disclose using the LTE-Advanced 8 Tx Codebook for a 2 Tx Active Antenna Array.

In these exemplary embodiments, the target is to illustrate the use of the 8 Tx codebook in e.g. LTE-Advanced with a 2 Tx vertical active antenna array in order to perform elevation beamforming with adjusted beams. More precisely, consider a 2 Tx antenna as illustrated in FIG. 5(a) above where each antenna has $N_C$ sub elements. The cross-polarized sub element pairs are placed along the vertical axis. Due to the design method of the precoder codebook for LTE-Advanced 8 Tx there will in the available set of precoder codewords for rank 1 exist multiple sets of four column vectors described as $$W^{(c)}_{8 \times 2k} W^{(t)}_{2k \times 1} = \begin{bmatrix} w_q \\ w_q \end{bmatrix}$$

$$q = 1, \ldots, 4$$

such that $w_{q1}$ and $w_{q2}$ are mutually orthogonal when $q_1 \neq q_2$, i.e. $w_{q1}^H w_{q2} = 0$ if $q_1 \neq q_2$ and $w_q^H w_q = \alpha_q \neq 0$. Given one set of orthogonal vectors, create the matrix $$\tilde{U}_{4 \times 4} = [w_1 \ w_1 \ w_3 \ w_4],$$

and $$U_{8 \times 8} = \begin{bmatrix} \tilde{U}_{4 \times 4} & 0 \\ 0 & \tilde{U}_{4 \times 4} \end{bmatrix}.$$

A set of orthogonal vectors may be selected out of the discrete Fourier Transformed (DFT) based vectors that are present in the 8 Tx LTE codebook. For example, every 8:th DFT vector out of the 32 different 4-element DFT vectors that are possible to form could constitute an orthogonal set of 4 vectors in $\tilde{U}_{4 \times 4}$.

Now instead consider the 2 Tx active antenna array. For the sub elements corresponding to the first polarization create four column vectors of length $N_C$ $$b_q = \begin{bmatrix} b_{1,q} \\ b_{2,q} \\ \vdots \\ b_{N_C,q} \end{bmatrix},$$

$$q = 1, \ldots, 4$$

such that $b_q$ corresponds to a beamforming vector when applied to the sub elements. This will hence correspond to beamforming in the elevation assuming that the cross-polarized sub element pairs are placed vertically. Now create the matrix, being the second matrix in the transformation, $$\tilde{B}_{N_C \times 4} = [b_1 b_2 b_3 b_4]$$

and concatenate this to form a dual polarized matrix of beamforming vectors $$B_{2N_C \times 8} = \begin{bmatrix} \tilde{B}_{N_C \times 4} & 0 \\ 0 & \tilde{B}_{N_C \times 4} \end{bmatrix}.$$

Finally, use the beamforming matrix to form an antenna port to sub element mapping described by $$\tilde{x}_{2N_C \times 1} = B_{2N_C \times 8} U_{8 \times 8}^H x_{8 \times 1}$$

where it is assumed that each row in $\tilde{x}_{2N_C \times 1}$ corresponds to one subelement and that the first $N_C$ elements correspond to one polarization whereas the other elements correspond to the other polarization. $U^H$ may be the first matrix and corresponds to the hermitian transpose of matrix U. Now we let the signal $x_{8\times1}$ be created just as if the system was using the 8 Tx codebook. Hence, when transmitting CSI-RS $x_{8\times1}$ will correspond to the CSI-RS signals produced when using the 8 Tx codebook.

For instance, given that the UE recommends a precoder to be used for rank 1 such that $$W_{8\times 2k}^{(c)} W_{2k\times 1}^{(t)} = \begin{bmatrix} w_q \\ w_q \end{bmatrix}$$
$$q = 1, \ldots, 4$$

the symbol $s_{1\times 1}$ will be transmitted as $$\tilde{x}_{2N_C\times 1} = B_{2N_C\times 8} U_{8\times 8}^H x_{8\times 1} =$$
$$B_{2N_C\times 8} U_{8\times 8}^H W_{8\times 2k}^{(c)} W_{2k\times 1}^{(t)} s_{1\times 1} = B_{2N_C\times 8} U_{8\times 8}^H \begin{bmatrix} w_q \\ w_q \end{bmatrix} s_{1\times 1} = \begin{bmatrix} \alpha_q b_q \\ \alpha_q b_q \end{bmatrix} s_{1\times 1}$$
$$q = 1, \ldots, 4$$

which corresponds to beamforming with the vector $b_q$. Hence, by using the 8 Tx codebook designed for beamforming in azimuth domain we are able to perform elevation beamforming with a 2 Tx active antenna array based on the Release-10 LTE standard.

It should be noted that an alternative way to formulate the port to sub-element mapping presented above is given as $$\tilde{x}_{2N_C\times 1} = B_{2N_C\times 8} U_{8\times 8}^H x_{8\times 1} = B_{2N_C\times 8} V_{8\times 8} V_{8\times 8}^H U_{8\times 8}^H x_{8\times 1} = B_{2N_C\times 8} V_{8\times 8} (U_{8\times 8} V_{8\times 8})^H x_{8\times 1}$$

where V is an arbitrary unitary matrix. One particular choice of V is given as $$V_{8\times 8} = \frac{1}{\sqrt{2}} \begin{bmatrix} I_{4\times 4} & I_{4\times 4} \\ I_{4\times 4} & -I_{4\times 4} \end{bmatrix}$$

where $I_{4\times 4}$ is an identity matrix. This would give $$\tilde{x}_{2N_C\times 1} = B_{2N_C\times 8} V_{8\times 8} (U_{8\times 8} V_{8\times 8})^H x_{8\times 1} =$$
$$\frac{1}{2}\begin{bmatrix} \tilde{B}_{N_C\times 4} & \tilde{B}_{N_C\times 4} \\ \tilde{B}_{N_C\times 4} & -\tilde{B}_{N_C\times 4} \end{bmatrix} \begin{bmatrix} \tilde{U}_{4\times 4} & \tilde{U}_{4\times 4} \\ \tilde{U}_{4\times 4} & -\tilde{U}_{4\times 4} \end{bmatrix}^H x_{8\times 1}$$

which may constitute an intuitive formulation when designing U for a general precoder codebook.

In some embodiments codebook subset restriction is used. LTE-Advanced supports the ability to for the eNodeB to restrict the UE in its choice of precoders $W_{8\times 2k}^{(c)} W_{2k\times 1}^{(t)}$ for feedback reporting, so-called codebook subset restriction. Thus, a subset of the precoders may be removed and only the remaining subset of the codebook is used. The embodiments are however not dependent on accessing all supported codewords and they will therefore be useful also when some codewords from the original codebook have been removed. Furthermore, if codebook subset restriction is used such that only the subset of precoders used when creating the matrix U is active we will get $$\tilde{x}_{2N_C\times 1} = \begin{bmatrix} \alpha_q b_q \\ \alpha_q b_q \end{bmatrix} s_{1\times 1}$$

as previously derived. This will in turn mean that designing $b_{i,q}$ with a constant modulus property, i.e. such that $|b_{i,q}|=\gamma_i$ for $q=1, \ldots, 4$, will imply that a power amplifier at the subelement corresponding to $b_{i,q}$ will get the same operational point independent on which precoder that is used. This is in many situations an appealing property since it can simplify the design of the power amplifier.

In some embodiments the radio base station 12 uses the LTE Release-10 8 Tx Codebook for an 1 Tx Active Antenna Array.

The embodiments presented above were directed towards a 2 Tx cross-polarized active antenna. The claimed method is however not limited to the particular case of 2 Tx antennas. Here will be described using only one active antenna in the active antenna array, hence 1 Tx. Consider a 1 Tx active antenna with $N_C$ sub elements and further assume that this antenna is mounted in a traditional fashion meaning that the sub elements are placed vertically. Here we can follow the lines of the embodiments mentioned above with some modifications. To start with $U_{8\times 8}$ is instead created as $$U_{8\times 8}[w_1 w_2 \ldots w_8]$$

where $w_{q1}$ and $w_{q2}$ are mutually orthogonal. Furthermore $$B_{N_C\times 8} = [b_1 b_2 \ldots b_8]$$

meaning that 8 beamforming vectors are used. Finally, use the port to subelement mapping described by $$\tilde{x}_{N_C\times 1} = B_{N_C\times 8} U_{8\times 8}^H x_{8\times 1}$$

in a similar manner to the embodiments above. Hence, by using the 8 Tx codebook we are able to perform elevation beamforming with a 1 Tx active antenna based on the LTE-Advanced standard.

It should be understood that the codebook subset restriction applies also to these embodiments.

In some embodiments the radio base station 12 uses the LTE-Advanced 8 Tx Codebook for a 4 Tx Active Antenna Array.

In these embodiments the target is to illustrate the use of the 8 Tx codebook in LTE-Advanced with a 4 TX active antenna array in order to perform a joint azimuth and elevation beamforming. Consider a 4 TX antenna with two closely spaced cross-poles. Furthermore assume that each active transmitting antenna has $N_C$ sub elements and that this active transmitting antenna is mounted in a traditional fashion meaning that the sub elements are placed vertically.

Create $$b_q^{elevation} = \begin{bmatrix} b_{1,q}^{elevation} \\ b_{2,q}^{elevation} \\ \vdots \\ b_{N_C,q}^{elevation} \end{bmatrix}, k = 1, \ldots, Q_{elevation}$$

and $$b_q^{azimuth} = \begin{bmatrix} b_{1,q}^{azimuth} \\ b_{2,q}^{azimuth} \end{bmatrix} 1, \ldots, Q_{azimuth}$$

such that $Q_{elevation} Q_{azimuth} = 4$. Here $b_q^{elevation}$ will create an antenna transmission pattern in elevation whereas $b_q^{azimuth}$ will create an antenna transmission pattern in azimuth. Now create $\tilde{B}_{2N_C \times 4}$ as $$\tilde{B}_{2N_C \times 4} = [b_1^{azimuth} \ldots b_{Q_{azimuth}}^{azimuth}] \otimes [b_1^{elevation} \ldots b_{Q_{elevation}}^{elevation}]$$

where $\otimes$ denotes the Kronecker product. Create $$B_{4N_C \times 8} = \begin{bmatrix} \tilde{B}_{2N_C \times 4} & 0 \\ 0 & \tilde{B}_{2N_C \times 4} \end{bmatrix}.$$

and reuse $$U_{8 \times 8} = \begin{bmatrix} \tilde{U}_{4 \times 4} & 0 \\ 0 & \tilde{U}_{4 \times 4} \end{bmatrix}$$

from the above embodiments to create the antenna port to sub element mapping $$\tilde{x}_{4N_C \times 1} = B_{4N_C \times 8} U_{8 \times 8}^H x_{8 \times 1}$$

where it is assumed that the first $N_C$ values of $\tilde{x}_{4N_C \times 1}$ correspond to sub elements of one active transmitting antenna and that the second $N_C$ values of $\tilde{x}_{4N_C \times 1}$ correspond to sub elements of the co-polarized active transmitting antenna. The remaining $2N_C$ values correspond to the two other active transmitting antennas in the orthogonal polarization. The suggested antenna port to sub element mapping will lead to a system where joint azimuth and elevation is performed by the created precoder vectors in azimuth and elevation, i.e. $b_q^{azimuth}$ and $b_q^{elevation}$.

It should be noted that although in this example $\tilde{B}_{2N_C \times 4}$ was created by a Kronecker product and an implicit ordering of the antenna elements; it is not necessary for $\tilde{B}_{2N_C \times 4}$ to have such a structure. In fact, any matrix of size $2N_C \times 4$ will be appropriate for the equations above.

Finally, one may combine these and other embodiments mentioned above and it components of the different embodiments may be used to perform joint azimuth and elevation beamforming by using the 8 Tx codebook for 4 co-polarized antennas. Codebook subset restriction is also applicable in these embodiments.

Conclusively, embodiments herein disclose a linear transformation and the structure may be imposed by $\tilde{x}_{4N_C \times 1} = B_{4N_C \times 8} U_{8 \times 8}^H x_{8 \times 1}$ or by any of the other corresponding formulas in the earlier embodiments and may be generalized to $$\tilde{x} = BU^H x$$

where $U^H$ is the first matrix having orthogonal rows matching some of the precoders when x comprises data, and thereby neutralizing the directions of the data transmission signal and where the columns in the second matrix B form directed data transmission signals that the user equipment 10 may effectively choose from.

Action 709.

Figure 8:
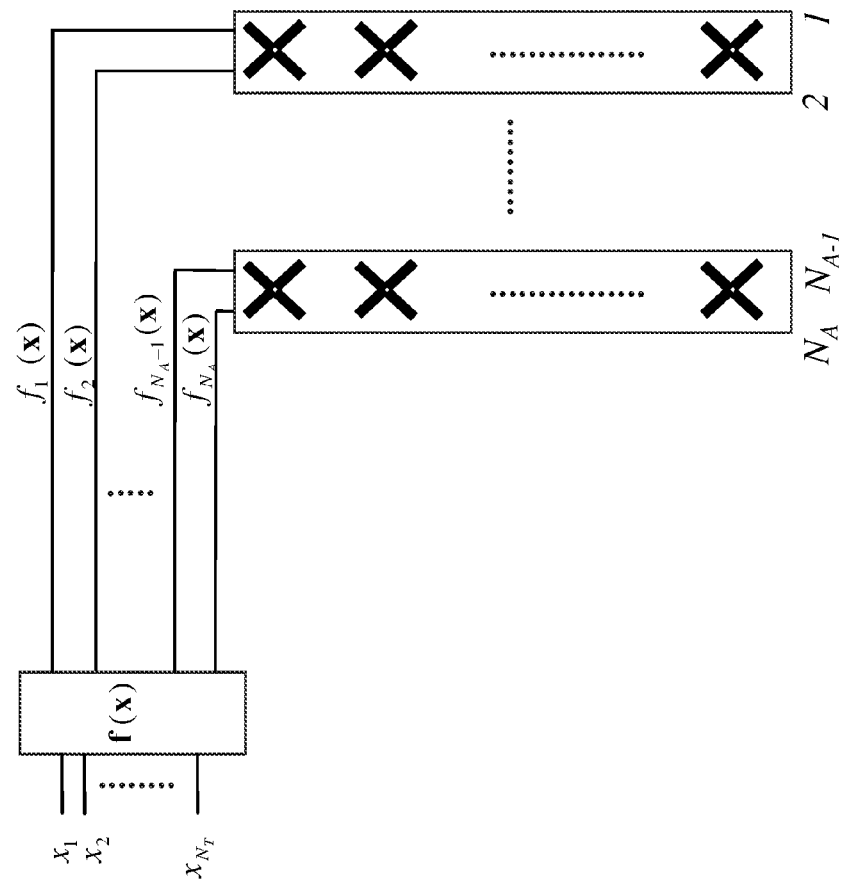
FIG. 8 is a block diagram depicting a mapping of antenna ports to sub elements of active transmitting antennas.

The radio base station 12 then transmits the transformed data signal that is precoded using the selected precoder. Thus, the radio base station 12 comprising an active antenna array of a number of active transmitting antennas directs the data signal towards the user equipment 10 based on feedback from the user equipment 10 in a vertical direction and in a reliable and efficient manner FIG. 8 is block diagram depicting embodiments wherein CSI-RSs are transmitted as part of the respective $x_i$ signal. This is a general form of the embodiments described above, $\tilde{x} = BU^H x$. Data transmission signals that have been precoded by a precoder of a $N_T$ Tx codebook are denoted $x_i$ where i = 1 ... $N_T$. The precoded data transmission signals are input into a transformation function f(x). The transformation generates a number of transformed data transmission signals and each output is mapped to a sub element of an active transmitting antenna $N_A$. As stated above some embodiments herein reuse an existing $N_T$ Tx codebook for an $N_A$ Tx active antenna array. For each active transmitting antenna in the active antenna array there is a function defined such that $$f(x):C^{N_T} \to C^{N_C}$$

where C denotes the set of complex values. Hence, for active transmitting antenna i there will be an $N_C$-dimensional vector $\tilde{x}_{N_C \times 1}$ produced based on the input $x_{N_T \times 1}$. Hence, the functions $f_n(x)$, where n is 1 ... $N_A$, define an antenna port to sub element mapping that is used both when $x_{N_T \times 1}$ comprises data and associated reference signals. Thus, the transformation may transform precoded data signals or reference signals of the second number into a different number of signals for the sub elements. The transformed signals are then mapped to sub elements of each active transmitting antenna.

Figure 9:
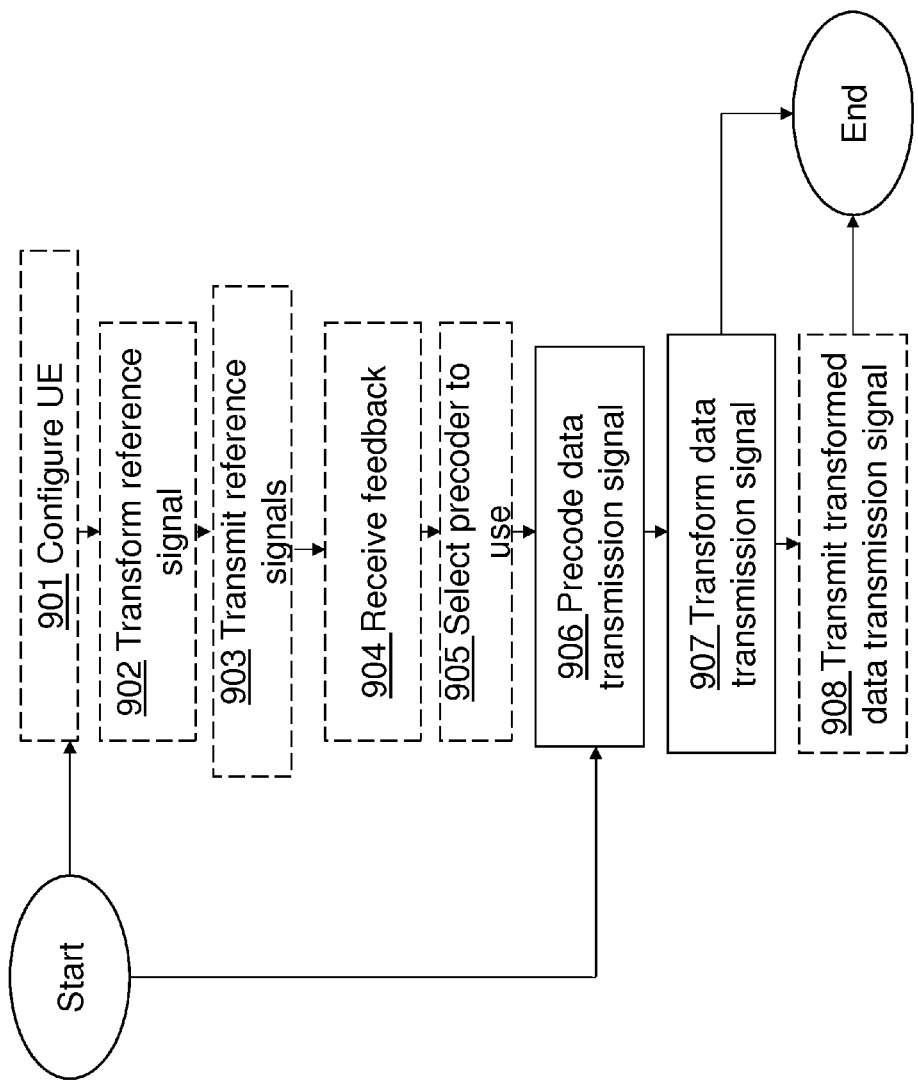
FIG. 9 is a flowchart depicting a method according to embodiments herein.

The method actions in the radio base station 12 for transforming the data transmission signal according to some general embodiments will now be described with reference to a flowchart depicted in FIG. 9. The actions do not have to be taken in the order stated below, but may be taken in any suitable order. Actions merely performed in some embodiments are marked as dashed boxes. The radio base station 12 is connected to an active antenna array of a first number of active transmitting antennas. Each active transmitting antenna comprises sub elements. These may be fed separately with individual signals and which radio base station 12 comprises a precoder codebook comprising precoders for transmitting signals in a diversified manner for a second number of antenna ports. The first number may be 1, 2 or 4 active transmitting antennas and the second number may be 4 or 8 antenna ports. The radio communications network 12 serves the user equipment 10 in the radio communications network. Each active transmitting antenna may comprise e.g. eight subelements.

Action 901.

The radio base station 12 may configure or inform the user equipment 10 served by the radio base station 12 to use a set of reference signals for feedback purpose, and which precoder codebook to use. Additionally or alternatively, the radio base station 12 may configure the user equipment 10 to feedback on a subset of the precoders to restrict an up-tilt of the data transmission signal and/or to decrease the variation of power level transmitted to each subelement of the radio base station 12.

Action 902.

The radio base station 12 may transform the set of reference signals each being transformed as the precoded data transmission signal in the transforming process below.

Action 903.

The radio base station 12 may transmit the set of reference signals that corresponds to a number antenna ports in the radio base station 12.

Action 904.

The radio base station 12 may then receive feedback, from the user equipment 10, indicating channel quality and a recommended precoder in the precoder codebook based on the transmitted reference signals.

Action 905.

The radio base station 12 may in response to said feedback selects the precoder to use for data transmission and to take the linear transformation into account to direct the data transmission signal.

Action 906.

The radio base station 12 precodes the data transmission signal with the precoder selected from the precoder codebook. The precoder codebook may comprise a precoder structure for eight transmission antenna ports.

Action 907.

The radio base station 12 transforms, linearly, the precoded data transmission signal by neutralizing a direction of the precoded data transmission signal and then directing the precoded data transmission signal vertically. For example, vertically along a vertical axis being aligned with a normal of a plane parallel with a surface of the earth. This enables the precoded data transmission signal to be adjusted vertically towards the user equipment 10 as the data transmission signal is diversified in the precoding and then directed vertically in the transformation. In some embodiments the radio base station 12 multiplies a signal vector of the data transmission signal with a first matrix to match directions in the precoded data transmission signal and thereby neutralizing the direction of the precoded data transmission signal. Furthermore, the radio base station 12 also multiplies with a second matrix to direct the data transmission signal vertically, wherein the first matrix comprises at least one row vector of a number of row vectors that is equal to the complex conjugate transpose of a column vector in the precoder codebook. Thus, a resulting vector $\tilde{x}$ is defined as $\tilde{x}=BU^H x$; where $U^H$ is the first matrix of e.g. 8×8 dimension, B is the second matrix and x is the signal vector of the data transmission signal. It should be noted that the first matrix is denoted as $U^H$ and one may use $a*U^H$ where a is some scalar, complex, parameter.

All the number of row vectors in the first matrix is, in some embodiments, different to one another, and wherein each row vector corresponds to the complex conjugate transpose of a column vector in the precoder codebook. The 8×8 matrix $U^H$ may have this property. In some embodiments all the number of row vectors of the first matrix are orthogonal relative one another. In some embodiments the first matrix comprises at least four row vectors e.g. the 8×8 matrix $U^H$. The first matrix may comprise Discrete Fourier Transform based elements, e.g. if 8 Tx codebook is used this may be the case for 8×8 matrix $U^H$ since the precoder codebook is created by DFT vectors. Note that the complex conjugate of a DFT vector is another DFT vector. The first matrix may be a block diagonal matrix. Some embodiments disclose where each column vector of the second matrix comprises Discrete Fourier Transform based elements, and is a design choice that may be used for any B-matrices and would mean that the vectors $b_i$ are DFT-vectors. Furthermore, elements of the second matrix may have different amplitude relative one another to introduce tapering for shaping the transmitted data transmission signal, e.g. scaling row elements. The phase of the elements of B would then be determined by the DFT vectors, while the tapering would define the magnitude of the elements of B. In some embodiments the radio base station 12 restricts an up-tilt of the data transmission signal by using codebook subset restriction. In some embodiments codebook subset restriction may be used to enable a more constant power level transmitted to each sub element of the radio base station 12. In some embodiments the transforming comprises to transform data signals or reference signals of the second number from the precoder into a third number of signals for the sub elements. The second and third numbers differ e.g. second number may be eight and the third number may be sixteen. The third number of signals are mapped to the sub elements of each active transmitting antenna.

Action 908.

The radio base station 12 may in some embodiments transmit the transformed data transmission signal over the sub elements of each active transmitting antenna of the active antenna array. The radio base station 12 may in some embodiments transmit the data transmission signal, wherein the selected precoder is used in the precoding and the data transmission signal is transformed in the transforming. Thus, the data transmission signal is directed based on the feedback from the user equipment 10 and the radio base station 12 may adjust the vertical direction of the data transmission signal. In some embodiments the data signal transmission is also directed along an azimuth axis, being perpendicular to the elevation axis E, in the transformation.

Thus, embodiments herein reuse an existing $N_T$ Tx codebook for an $N_A$ Tx active antenna array. It is herein described how to convert or transform signals and support existing codebooks for $N_T$ Tx antenna ports emulating a precoder codebook appropriate for a given $N_A$ Tx active antenna array with $N_C$ subelements per active transmitting antennas, Tx. Different Nc:s may be used for different active transmitting antennas. For example, embodiments relate to use LTE-advanced 8 Tx codebook for a 2 Tx active Antenna Array. Some embodiments overcome the disadvantage that only a limited set of Tx antennas and corresponding precoder codebooks are supported for feedback from the user equipment 10 in the LTE-Advanced standard. In particular the 8 Tx codebook is used with an active antenna array. It is further disclosed how the 8 Tx codebook designed for beamforming in azimuth can be reused for elevation beamforming by redirecting the beams in the codebook and applying these to a 2 Tx active antenna array. Some embodiments relate to Codebook subset restriction and further also to achieve a constant modulus property on the created symbol to sub element mapping. This is useful since it allows the power amplifiers to run more efficiently. Some embodiments uses the LTE-Advanced 8 Tx Codebook for a 1 Tx Active Antenna Array, wherein the LTE-Advanced 8 Tx codebook is used for elevation beamforming when using a 1 Tx active antenna array. Furthermore, some embodiments uses the LTE-Advanced 8 Tx Codebook for a 4 Tx Active Antenna Array. Furthermore, some embodiments uses the LTE-Advanced 8 Tx codebook or other precoder codebooks for performing joint azimuth and elevation beamforming when using a 4 Tx active antenna array or other active antenna arrays.

Figure 10:
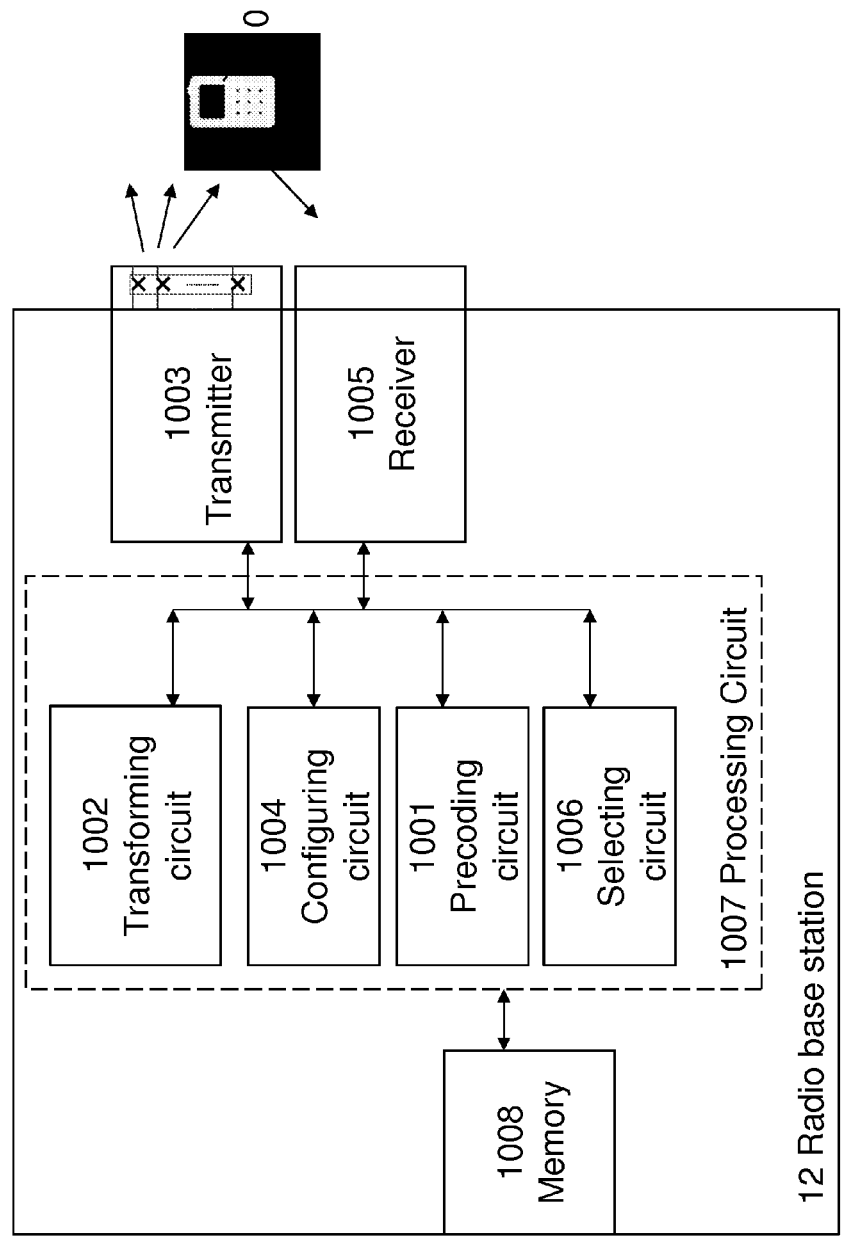
FIG. 10 is a block diagram depicting the radio base station according to embodiments herein.

FIG. 10 is a block diagram depicting a radio base station for transforming a data transmission signal according to some embodiments herein. The radio base station 12 is configured to connect to an active antenna array of the first number of active transmitting antennas. As stated above each active transmitting antenna comprises sub elements, and the radio base station 12 is configured to comprise a precoder codebook. The precoder codebook comprises precoders for transmitting signals in a diversified manner for the second number of antenna ports. The radio communications network 12 serves the user equipment 10 in the radio communications network.

The radio base station 12 comprises a precoding circuit 1001 configured to precode the data transmission signal with a precoder selected from the precoder codebook.

The radio base station 12 further comprises a transforming circuit 1002 configured to transform, linearly, the precoded data transmission signal by neutralizing the direction of the precoded data transmission signal and then directing the precoded data transmission signal vertically. Embodiments herein the enable the precoded data transmission signal to be vertically adjusted towards the user equipment 10. The transforming circuit 1002 may further be configured to multiply a signal vector of the data transmission signal with a first matrix to match directions in the precoded data transmission signal and thereby neutralizing the direction of the precoded data transmission signal. Then, the transforming circuit 1002 may multiply with a second matrix to direct the data transmission signal vertically. The first matrix may comprise at least one row vector of a number of row vectors that is equal to the complex conjugate transpose of a column vector in the precoder codebook. In some embodiments herein all the row vectors in the first matrix are different to one another, and wherein each row vector corresponds to the complex conjugate transpose of a column vector in the precoder codebook. In some embodiments herein all the number of row vectors of the first matrix are orthogonal relative one another. In some embodiments herein the first matrix comprises at least four row vectors. In some embodiments herein the first matrix comprises Discrete Fourier Transform based elements. In some embodiments herein the first matrix is a block diagonal matrix. In some embodiments herein each column vector of the second matrix comprises Discrete Fourier Transform based elements. In some embodiments herein the elements of the second matrix have different amplitude relative one another shaping the transmitted data transmission signal. In some embodiments herein the precoder codebook comprises a precoder structure for eight transmission antenna ports. In some embodiments the transforming circuit 1002 may be configured to transform data signals or reference signals of the second number from the precoder into a third number of signals for the sub elements. The second and third numbers differ e.g. second number may be eight and the third number may be sixteen. The third number of signals are mapped to the sub elements of each active transmitting antenna.

The radio base station 12 may further comprise a transmitter 1003 configured to transmit the transformed data transmission signal over the sub elements of each active transmitting antenna of the active antenna array.

In some embodiments herein the transforming circuit 1002 is further configured to transform a set of reference signals each being transformed as the data transmission signal. Then, the radio base station 12 further comprises a transmitter 1003 configured to transmit the set of reference signals that corresponds to a number of antenna ports in the radio base station 12.

The radio base station 12 may further comprise a configuring circuit 1004 arranged to configure the user equipment 10 served by the radio base station 12 to use the set of reference signals for feedback purpose, and which precoder codebook to use.

The radio base station 12 may further comprise a receiver 1005 configured to receive feedback, from the user equipment 10, indicating channel quality and a recommended precoder in the precoder codebook based on the transmitted reference signals.

The radio base station 12 may further comprise a selecting circuit 1006 configured to select the precoder to use for data transmission based on the feedback and taking linear transformation into account to direct the data transmission signal. Thus, the precoding circuit 1001 is then configured to use the selected precoder and the transforming circuit 1002 is configured to transform the data transmission signal. Furthermore, the transmitter 1003 is further configured to transmit the transformed data transmission signal.

In some embodiments the configuring circuit 1005 is further arranged to configure the user equipment 10 to feedback on a subset of precoders to restrict an up-tilt of the data transmission signal. The transforming circuit 1002 may further be configured to restrict an up-tilt of the data transmission signal and/or to reduce a peak power of the radio base station 12. According to some embodiments the data transmission signal is also directed along an azimuth axis.

The embodiments herein for transforming the data transmission signal may be implemented through one or more processors, such as a processing circuit 1007 in the radio base station 12 depicted in FIG. 10, together with computer program code for performing the functions and/or method steps of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station 12 may further comprise a memory 1008. The memory 1008 may comprise one or more memory units and may be used to store for example data such as reference symbols, transformations, mappings, matrices, precoder, precoder codebooks, channel quality, configuration data, applications to perform the methods herein when being executed on the radio base station 12, and/or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments herein being defined by the following claims.

The invention claimed is:

1. A method in a radio base station for transforming a data transmission signal in a radio communications network, which radio base station serves a user equipment in the radio communications network, and wherein the radio base station is connected to an active antenna array of a first number of active transmitting antennas, each active transmitting antenna comprising sub elements, and which radio base station comprises a precoder codebook comprising precoders for transmitting signals in a diversified manner for a second number of antenna ports, the method comprising:
   precoding the data transmission signal with a precoder selected from the precoder codebook; and
   transforming, linearly, the precoded data transmission signal by neutralizing a direction of the precoded data transmission signal and then directing the precoded data transmission signal vertically, thereby enabling vertical adjustment of the precoded data transmission signal towards a user equipment.

2. The method of claim 1, wherein the transforming comprises multiplying a signal vector of the data transmission signal with a first matrix to match directions in the precoded data transmission signal and thereby neutralizing the direction of the precoded data transmission signal, and then multiplying with a second matrix to direct the data transmission signal vertically, wherein the first matrix comprises at least one row vector of a number of row vectors that is equal to the complex conjugate transpose of a column vector in the precoder codebook.

3. The method of claim 2, wherein all the number of row vectors in the first matrix are different from one another, and wherein each row vector corresponds to the complex conjugate transpose of a column vector in the precoder codebook.

4. The method of claim 2, wherein all the number of row vectors of the first matrix are orthogonal relative to one another.

5. The method of claim 2, wherein the first matrix comprises at least four row vectors.

6. The method of claim 2, wherein the first matrix comprises Discrete Fourier Transform based elements.

7. The method of claim 2, wherein the first matrix is a block diagonal matrix.

8. The method of claim 2, wherein each column vector of the second matrix comprises Discrete Fourier Transform based elements.

9. The method of claim 2, wherein elements of the second matrix have different amplitudes relative to one another shaping the transmitted data transmission signal.

10. The method of claim 1, wherein the transforming comprises transforming data signals or reference signals of the second number from the precoder into a third number of signals for the sub elements, wherein the second and third numbers differ and the third number of signals are mapped to sub elements of each active transmitting antenna.

11. The method of claim 1, wherein the precoder codebook comprises a precoder structure for eight transmission antenna ports.

12. The method of claim 1, wherein the method further comprises transmitting the transformed data transmission signal over the sub elements of each active transmitting antenna of the active antenna array.

13. The method of claim 1, further comprising:
configuring the user equipment served by the radio base station to use a set of reference signals for feedback purpose, and which precoder codebook to use;
transforming the set of reference signals each being transformed as the data transmission signal in the transforming;
transmitting the set of reference signals that corresponds to a number of antenna ports in the radio base station;
receiving feedback, from the user equipment, indicating channel quality and a recommended precoder in the precoder codebook based on the transmitted reference signals;
selecting the precoder to use for data transmission based on the feedback and taking linear transformation into account to direct the data transmission signal; and
transmitting the transformed data transmission signal, and the precoding, using the selected precoder, and the transforming directs the data signal vertically.

14. The method of claim 13, wherein the configuring further comprises configuring the user equipment to feedback on a subset of precoders to restrict an up-tilt of the data transmission signal or to enable a more constant power level transmitted from each sub element, or both.

15. The method of claim 1, wherein the transforming further comprises restricting an up-tilt of the data transmission signal.

16. The method of claim 1, wherein the transformation also directs the data transmission signal along an azimuth axis.

17. A radio base station for transforming a data transmission signal in a radio communications network, wherein the radio base station is configured to connect to an active antenna array of a first number of active transmitting antennas and to serve a user equipment in the radio communications network, each active transmitting antenna comprising sub elements, and which radio base station is configured to comprise a precoder codebook comprising precoders for transmitting signals in a diversified manner for a second number of antenna ports, which radio base station comprises:
a precoding circuit configured to precode the data transmission signal with a precoder selected from the precoder codebook; and
a transforming circuit configured to transform, linearly, the precoded data transmission signal by neutralizing a direction of the precoded data transmission signal and then directing the precoded data transmission signal vertically thereby the precoded data transmission signal is enabled to be vertically adjusted towards the user equipment.

18. The radio base station of claim 17, wherein the transforming circuit is further configured to multiply a signal vector of the data transmission signal with a first matrix to match directions in the precoded data transmission signal and thereby neutralize the direction of the precoded data transmission signal, and then to multiply with a second matrix to direct the data transmission signal vertically, wherein the first matrix comprises at least one row vector of a number of row vectors that is equal to the complex conjugate transpose of a column vector in the precoder codebook.

19. The radio base station of claim 18, wherein all the number of row vectors in the first matrix are different to one another, and wherein each row vector corresponds to the complex conjugate transpose of a column vector in the precoder codebook.

20. The radio base station of claim 18, wherein all the number of row vectors of the first matrix are orthogonal relative to one another.

21. The radio base station of claim 18, wherein the first matrix comprises at least four row vectors.

22. The radio base station of claim 18, wherein the first matrix comprises Discrete Fourier Transform based elements.

23. The radio base station of claim 18, wherein the first matrix is a block diagonal matrix.

24. The radio base station of claim 18, wherein each column vector of the second matrix comprises Discrete Fourier Transform based elements.

25. The radio base station of claim 18, wherein elements of the second matrix have different amplitudes relative to one another shaping the transmitted data transmission signal.

26. The method of claim 17, wherein the transforming circuit is further configured to transform data signals or reference signals of the second number from the precoder into a third number of for the sub elements, wherein the second and third numbers differ and the third number of signals are mapped to sub elements of each active transmitting antenna.

27. The radio base station of claim 17, wherein the precoder codebook comprises a precoder structure for eight transmission antenna ports.

28. The radio base station of claim 17, further comprising a transmitter configured to transmit the transformed data transmission signal over the sub elements of each active transmitting antenna of the active antenna array.

29. The radio base station of claim 17, wherein the transforming circuit is further configured to transform a set of reference signals each being transformed as the data transmission signal, and wherein the radio base station further comprises:
a transmitter configured to transmit the set of reference signals that corresponds to a number of antenna ports in the radio base station;

a configuring circuit arranged to configure the user equipment served by the radio base station to use the set of reference signals for feedback purpose, and which precoder codebook to use;

a receiver configured to receive feedback, from the user equipment, indicating channel quality and a recommended precoder in the precoder codebook based on the transmitted reference signals;

a selecting circuit configured to select the precoder to use for data transmission based on the feedback and taking linear transformation into account to direct the data transmission signal, and wherein the precoding circuit is configured to use the selected precoder and the transforming circuit is configured to transform the data transmission signal and the transmitter is further configured to transmit the transformed data transmission signal.

30. The radio base station of claim 29, wherein the configuring circuit is further arranged to configure the user equipment to feedback on a subset of precoders to restrict an up-tilt of the data transmission signal or to enable a more constant power level transmitted from each sub element, or both.

31. The radio base station of claim 17, wherein the transforming circuit is further configured to restrict an up-tilt of the data transmission signal.

32. The radio base station of claim 17, wherein the data transmission signal is also directed along an azimuth axis.

* * * * *

UNITED STATES PATENT AND TRADEMARK OFFICE
CERTIFICATE OF CORRECTION

PATENT NO.        : 8,885,749 B2
APPLICATION NO.   : 13/520906
DATED             : November 11, 2014
INVENTOR(S)       : Wernersson et al.

Page 1 of 1

It is certified that error appears in the above-identified patent and that said Letters Patent is hereby corrected as shown below:

In the Claims

In Column 20, Line 46, in Claim 26, delete "method of" and insert -- radio base station of --, therefor.

Signed and Sealed this
Fourteenth Day of July, 2015

Michelle K. Lee
*Director of the United States Patent and Trademark Office*